Feb. 6, 1945.　　　F. W. JAMES　　　2,368,990
LIQUID PROPORTIONING APPARATUS
Filed March 25, 1942　　　2 Sheets-Sheet 1
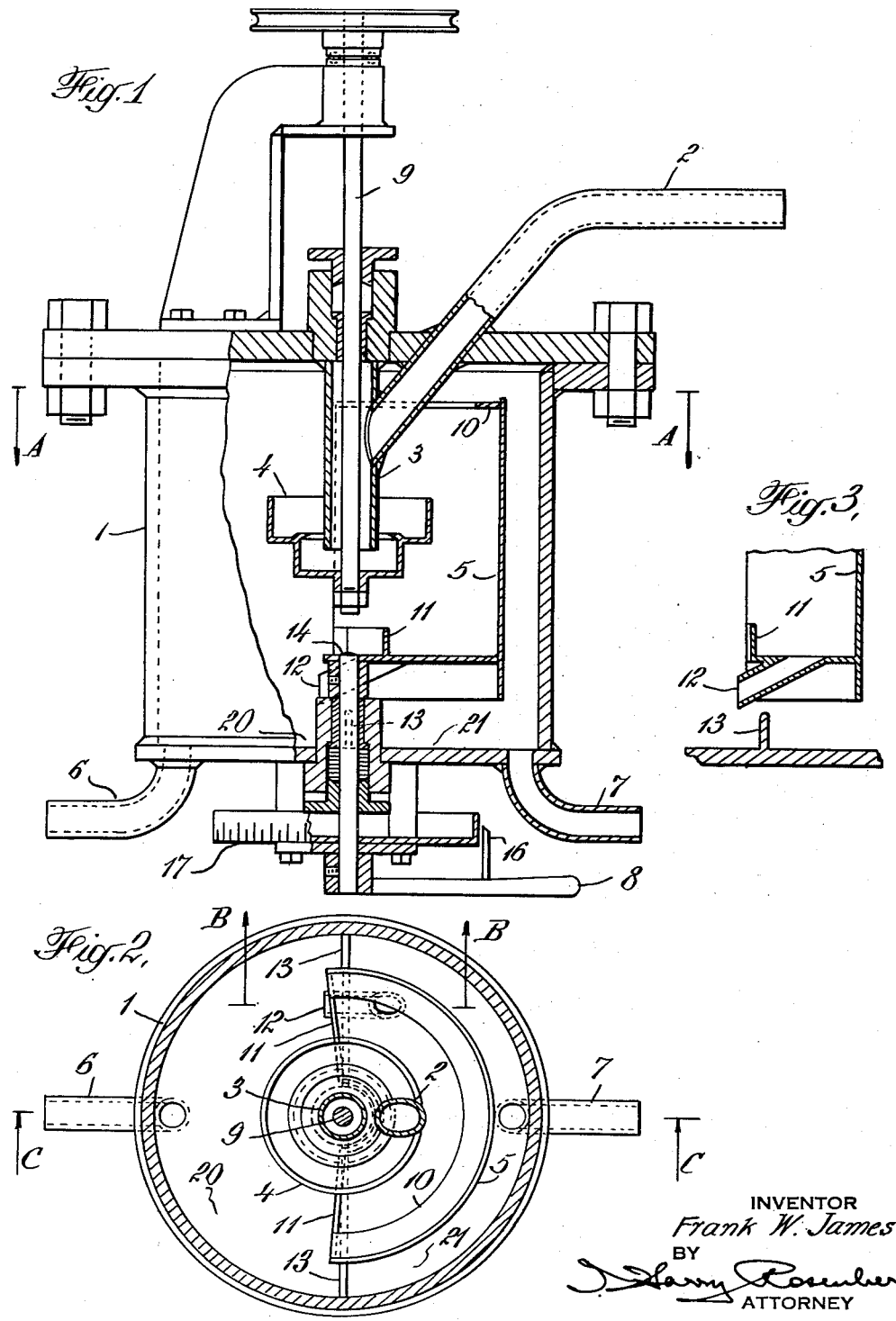
INVENTOR
Frank W. James
BY
Harry Rosenberg
ATTORNEY

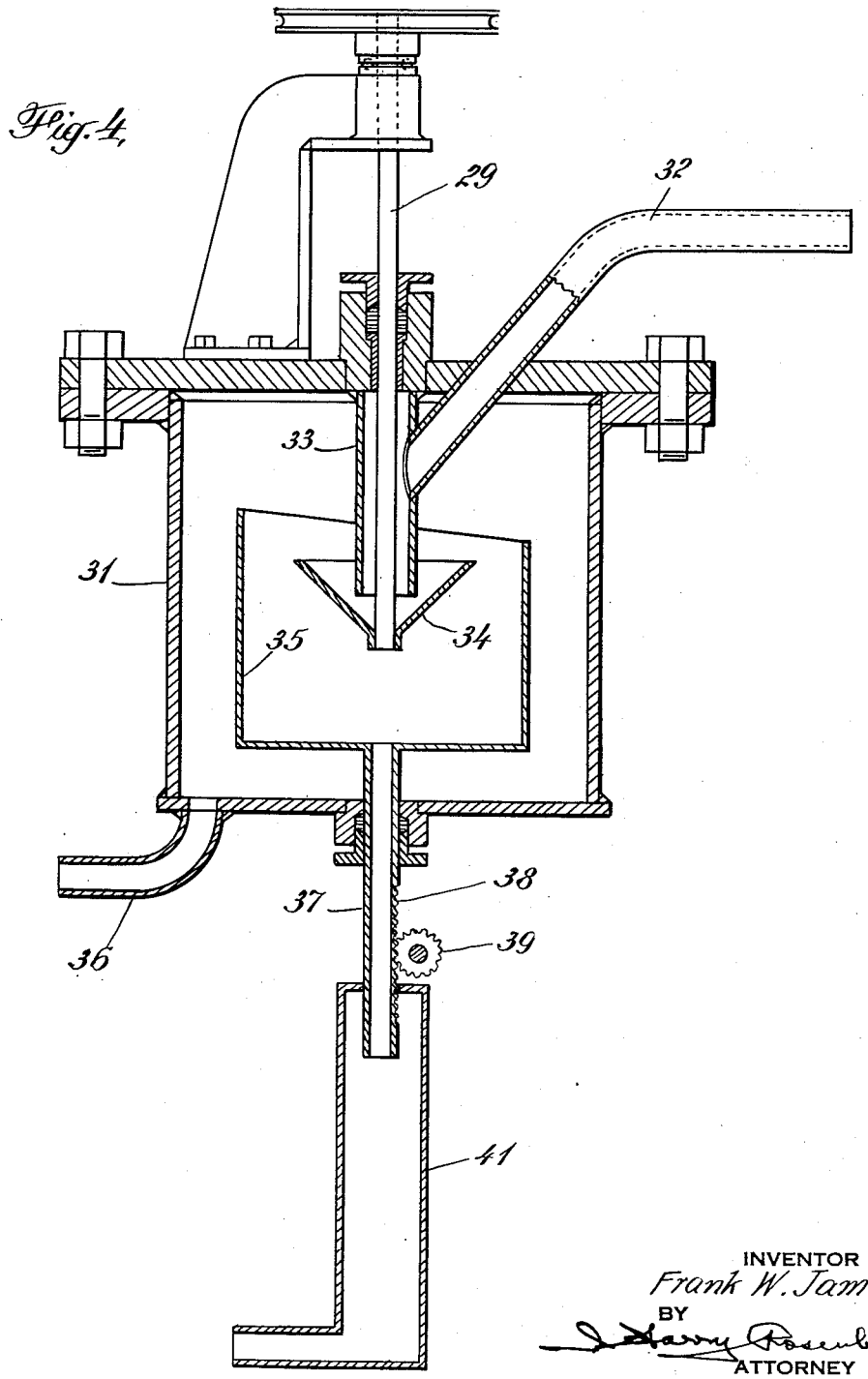

UNITED STATES PATENT OFFICE 2,368,990

LIQUID PROPORTIONING APPARATUS

Frank W. James, Huntsville, Ala., assignor to Allied Chemical & Dye Corporation, New York, N. Y., a corporation of New York Application March 25, 1942, Serial No. 436,153

13 Claims. (Cl. 137—166)

The present invention relates to an apparatus for proportioning liquid in a fixed ratio which is independent of the total rate of flow of liquid through the apparatus. The apparatus of the present invention can be applied to any process in which a stream of liquid is to be divided into two or more streams bearing a fixed ratio to each other. It is particularly applicable to controlling the reflux ratio in distillation apparatus. In such apparatus it is common practice to condense the entire distillate in a total condenser and then divide the condensate into two streams, one being the reflux and the other being the product. It is known that the reflux ratio, i. e., the ratio of reflux to product, is of great importance in controlling both the amount and quality of the product.

It is well known that in the operation of a distillation apparatus the reflux ratio must be higher near the beginning of the distillation run than during the steady operation. Thus it is common practice to begin the distillation in a distillation tower by returning all of the condensate to the tower so as to make sure that the packing of the tower is thoroughly wet with condensate and insure a good separation of the product. After the distillation has begun, it is desirable to gradually change the reflux ratio so as to obtain a flow of product and then to maintain the reflux ratio constant so as to obtain a product of desired uniform quality. In order to maintain uniform quality of product it is important that the reflux ratio remain constant regardless of variations in the flow of distillate.

One object of the present invention is to provide apparatus of the character specified which is simple in construction, automatic in operation, and practically trouble-free.

Another object of the invention is to provide a flow-box by means of which the proportioning of liquid can be controlled and changed without interrupting the flow of liquid through the flow-box.

Additional objects of the invention are to provide a flow-box by means of which the reflux ratio in a distillation column can be readily adjusted and maintained at a predetermined value; to provide means for maintaining the reflux ratio in a distillation column at a predetermined value which is independent of the rate of flow of condensate; and to provide a flow-box by means of which the reflux ratio can be changed and controlled without interrupting the flow of liquid.

Other objects of the invention will in part be obvious and will in part appear hereinafter.

The invention accordingly comprises the hereindescribed apparatus embodying features of construction, combination of elements and arrangement of parts which are adapted to accomplish such objects, all as exemplified in the following detailed disclosure and illustrated in the accompanying drawings. The scope of the invention will be indicated in the claims.

In its general aspect, the apparatus of the present invention comprises a vessel having a plurality of outlets, means for distributing liquid among said outlets, and means interposed between said distributing means and at least a portion of one of said outlets whereby at least a portion of the liquid distributed toward the latter outlet may be diverted to a different outlet. Preferably, the distributing means distributes the liquid substantially uniformly among the outlets and the interposed means is adjustable, so that it can be placed in any predetermined position to divert a predetermined portion of the liquid from one outlet to another. A particularly desirable form of the invention comprises means for distributing liquid substantially uniformly about a central point, adjustable means for intercepting a portion of the liquid so distributed, and means for delivering the portion of liquid so intercepted to any desired outlet. The means for distributing the liquid uniformly about a central point may be a rotating cup, core, or disk, or any similar means. The intercepting means is preferably a segment of a cylinder having a closed bottom and open top, adjustably positioned to intercept liquid distributed by the rotating distributor, and containing an outlet for delivering intercepted liquid to the desired outlet of the container or flow-box.

The invention will be described further with respect to its application to a flow-box connected to a distillation apparatus and used to collect the condensate from the distillation apparatus and return part of the condensate as reflux and send the rest of the condensate to a receiver for the product. It will be understood that this description is for illustrative purposes only and that the apparatus may be used in any situation where it is desired to divide a stream of liquid into two or more streams having a controllable and constant ratio to each other.

In the drawings, Figure 1 is an elevation, partly in section along the line C—C of Figure 2, of a condensate flow-box showing one form of the invention;

Figure 2 is a horizontal section taken along the line A—A of Figure 1;

Figure 3 is a vertical section taken along the line B—B of Figure 2, showing a detail of the apparatus; and Figure 4 is a vertical section of a modified form of the condensate flow-box shown in Figure 1.

Referring to the drawings, the numeral 1 indicates a closed cylindrical flow-box which is divided at the bottom by a dam 13 forming two equal semi-circular shallow compartments, 20 and 21. An outlet 6 leads from the compartment 20 and an outlet 7 leads from the compartment 21.

An axle 9 passes through the top of the flow-box at the center and is mounted for rotation at high speed by suitable means, not shown, such as a direct- or belt-drive connection. At the lower end of the axle 9, a cup 4 is rigidly attached so that it can be rotated at high speeds by means of the axle 9. An inlet conduit 2 passes through the top of the flow-box and terminates at the inner surface of a hollow sleeve 3 which is placed concentrically about the axle 9 and has one end opening into the cup 4 directly above the bottom of the cup.

Slightly more than half of the inner surface of the flow-box is shielded by a rotatably adjustable shield 5 which is in the form of a segment of a hollow, open-top cylinder, mounted axially of the flow-box on a rotatably adjustable shaft 14 which extends through the bottom of the flow-box. An external handle 8 is attached to the shaft 14. Thus the shield 5 can be rotated through an arc of 360° and its position adjusted by moving the handle 8. A scale 17 on the flow-box and a pointer 16 on the handle 8 provide means for calibrating the position of the shield within the flow-box.

The shield 5 is provided with a dam 11 forming a receptacle at its base for retaining liquid within the shield and a lip 10 around the top inner edge for catching liquid spray and minimizing loss of liquid over the top edge of the shield. A discharge outlet 12 from the bottom of the shield is provided for discharging liquid into one of the compartments 20 and 21.

As shown, the shield 5 subtends an arc of 190° so as to compensate for loss of liquid along the side edges of the shield. The outlet 12 projects beyond a side edge of the shield, so that when the shield completely shields one of the compartments 20 and 21, the outlet discharges into the other of said compartments.

In operation, the liquid to be apportioned, such as the total condensate from a condenser receiving the vapor from a distillation column, is introduced into the flow box through the conduit 2. The liquid is directed by the hollow tube 3 into cup 4 while it is being rotated, preferably at high speed, and the liquid is thereby ejected centrifugally towards the walls of the flow-box. Substantially half of the ejected liquid is intercepted by the shield 5 and the remainder passes into the unshielded portions of the flow-box. Depending on the position of the shield 5 and the resulting position of its discharge member 12 with respect to the dam 13, the liquid intercepted by the shield 5 is directed into one of the compartments 20 and 21.

Thus, in one extreme case, as when shield 5 and discharge member 12 are in the position shown in Figures 1 and 2, all of the liquid intercepted by the shield 5 is discharged through the discharge outlet 12 into compartment 20 and from there through outlet 6. Since the unintercepted liquid also passes into compartment 20, the result is total discharge of liquid through outlet 6 and no (or substantially no) discharge of liquid through outlet 7. In the other extreme case, wherein the position of the shield 5 is the reverse of that shown in Figures 1 and 2, the total discharge of liquid is through outlet 7. Between these two extremes the discharge of liquid introduced into the flow-box through inlet conduit 2 can be apportioned substantially to any desired ratio between the outlets 6 and 7 by suitable adjustment of the shield 5.

For example, a ratio of 4 parts of reflux to 1 part of forward flow to product can be obtained by an adjustment of the shield 5 counter-clockwise from the position shown in Figures 1 and 2 to a position such as to expose about 72° of arc of the circumference of compartment 21 to uninterrupted flow of liquid distributed by rotating cup 4 and collect the remainder of the liquid in compartment 20 by means of shield 5, discharging into compartment 20, and the flow of liquid into the unshielded portion of compartment 20.

It will be noted that the apportionment of the liquid between outlets 6 and 7 is not dependent upon any particular rate of flow of liquid through the flow-box 1 but is fixed for any particular position of the shield 5. Consequently, the present invention is of particular value for use in connection with a distillation operation in which vapors are condensed and returned to the still, for example as reflux, during the distillation.

Referring to Figures 1 and 2, when the shield 5 is in the position shown in these figures, substantially all of the liquid which would normally fall into compartment 21 is intercepted by the shield and delivered to compartment 20. If outlet 6 returns to the still as reflux liquid recovered as condensate, and outlet 7 delivers to a product receiver liquid recovered as condensate, when the shield 5 is in the position shown in the figures all of the condensate will be delivered as reflux and there will be no product delivered. Such a situation would be desired at the beginning of a distillation run and until all of the packing of the distillation tower was thoroughly wet. As the distillation proceeded, the position of the shield would be changed by moving the handle 8 so that only a fraction of the liquid normally discharged by cup 4 into compartment 21 would be intercepted and diverted to compartment 20. In this way some product would be delivered to the receiver through outlet 7. Thus, by proper adjustment of the handle 8 any desired part of the total liquid could be delivered to product or to reflux. In whatever predetermined position the shield 5 is fixed, the ratio of reflux to product and thus the reflux ratio will be constant and entirely independent of the total flow of liquid to the flow-box.

The apparatus hereindescribed can be applied to any distillation process. Thus it may be applied to a distillation of a mixture of pyridine and benzene distilled in a still equipped with a multiple tube fractionation column the tubes of which are packed with Raschig rings, such as the apparatus described in United States Patent 2,165,481 to Kranz. When carrying out such a distillation, employing the apparatus of the present invention as the flow-box, shield 5 is set in the position shown in Figures 1 and 2 at the beginning of the distillation and total condensate is thus returned as reflux until the tube packings have had sufficient contact with reflux material to become thoroughly wetted. Thereafter, the shield 5 is moved to a position such as to apportion the distillate into one part of forward flow to product (which is substantially pure benzene) and four parts of reflux liquid, the position referred to above. The distillation is then continued with this reflux ratio of 4 to 1.

The form of invention above described is adapted to divide the incoming stream of liquid into two streams having a constant and predetermined ratio to each other. Obviously, however, the invention may be embodied in apparatus of other forms.

Further, the invention includes other types of intercepting means for diverting liquid distributed to an outlet. For example, in the embodiment of the invention illustrated in Figure 4, the intercepting means comprises a shield 35, closed at the bottom and open at the top, adapted to intercept any desired amount of the total liquid distributed by a rotating distributor 34, which is shown in the form of an inverted cone, mounted on rotating shaft 29 which is rotated by external means. As in the case of the embodiment of the invention illustrated in Figures 1, 2 and 3, the liquid entering through the tube 32 is carried by the sleeve 33 into the bottom of the cone 34, which distributes it in the form of a spray around the inside of the flow-box 31. The shield 35 is in the form of a cylinder concentric with the shaft 29 and is mounted on a hollow shaft 37 which can be moved in a vertical direction by suitable means such as a rack 38 and pinion 39 or some similar arrangement. The opening in the shaft 37 is in register with an opening in the bottom of the cylinder 35 so as to form an outlet for liquid which collects in the cylinder. By adjusting the height of the shield 35 with relation to the cone 34, the amount of the liquid, distributed by cone 34, which is intercepted by the shield 35 may be controlled. Thus the higher shield 35 is set with relation to cone 34, the more of the liquid will be intercepted. Preferably, as shown in Figure 4, the shield 35 is in the form of a truncated cylinder, having its top edge cut at an angle to its base, so as to provide for a gradual rate of change in proportioning and thereby make the device selective. All of the liquid which is intercepted by the shield 35 is discharged through the hollow center of the shaft 37 into outlet 41. The liquid which is not intercepted by shield 35 is collected within the flow-box 31 and is removed through outlet 36. Thus, by proper adjustment of the position of the shield, the liquid entering the flow-box may be divided in any desired proportion between outlet 36 and outlet 41.

In the embodiment of the invention illustrated in Figures 1, 2 and 3, the shield 5 is depicted as covering 190° of arc about the central axis, that is, 10° more than the one-half of the circumference of the flow-box theoretically necessary for securing complete shielding of one compartment. This represents a preferred form of the invention since it approximately compensates for leakage past the edges of the shield 5 so as to enable it to intercept practically one-half of the total liquid distributed by rotating cup 4.

The shield 5 can of course comprise any desired segment of a cylinder although the flexibility of the apparatus, i. e., the ranges of reflux ratios obtainable depends upon the angle subtended by the shield. Thus the larger the angle subtended by the shield up to about 180°, the greater the range of reflux ratios obtainable.

The present invention is not limited as to size or materials of construction since such factors are determined by the particular use to which the invention is applied. Nor is the invention limited as to the position of the flow-box with respect to the other apparatus used. Thus, when employed in conjunction with an apparatus of the type disclosed in United States Patent 2,165,489 to Kranz, the flow-box may be positioned directly above the distillation tower so as to have the rotating cup in the flow-box and the rotating cup in the distributing section of the distillation tower on a single axis, for convenience of construction and operation.

Since changes may be made in the above construction and different embodiments of the invention could be made without departing from the scope thereof, it is intended that all matter contained in the above description or shown in the accompanying drawings shall be interpreted as illustrative and not in a limiting sense.

I claim:

1. In a liquid distributing system, the combination comprising a flow-box, a rotatable shaft mounted in the top of the flow-box, a liquid distributor within said flow-box mounted on said rotatable shaft, means for feeding liquid to the distributor, a partition within the flow-box dividing the bottom portion of the flow-box into two outlet chambers, a rotatable shaft mounted in the bottom of the flow-box, and a shield mounted on the latter shaft within said flow-box above said partition so as to project into the path of liquid distributed by the distributor and intercept at least a portion of the liquid distributed to one of said outlet chambers, said shield comprising a segment of a cylinder having a closed bottom and an open top and having an outlet for delivering intercepted liquid to the other outlet chamber.

2. In a liquid distributing system, the combination comprising a cylindrical flow-box, a rotatable shaft axially mounted in the top of the flow-box, a liquid distributor within said flow-box mounted on said rotatable shaft, means for feeding liquid to the distributor, a partition within the flow-box dividing the bottom portion of the flow-box into two outlet chambers, a rotatable shaft axially mounted in the bottom of the flow-box, a shield mounted on the latter shaft within said flow-box above said partition so as to project into the path of liquid distributed by the distributor and intercept at least a portion of the liquid distributed to one of said outlet chambers, said shield comprising a segment of a cylinder having a closed bottom and an open top and having an outlet for delivering intercepted liquid to the other outlet chamber, a handle for rotating the latter shaft, and means connected to said shaft for indicating the position of the shield within the flow-box.

3. In a liquid distributing system, the combination comprising a cylindrical flow-box, a rotatable shaft axially mounted in the top of the flow-box, a liquid distributor within said flow-box mounted on said rotatable shaft, means for feeding liquid to the distributor, a partition within the flow-box dividing the bottom portion of the flow-box into two outlet chambers, a rotatable shaft axially mounted in the bottom of the flow-box, a shield mounted on the latter shaft within said flow-box above said partition so as to project into the path of liquid distributed by the distributor and intercept at least a portion of the liquid distributed to one of said outlet chambers, said shield comprising a segment of a cylinder having a substantially semi-circular closed bottom and an open top and having an outlet for delivering intercepted liquid to the other outlet chamber.

4. In a liquid distributing system, a vessel having a plurality of outlets, means for uniformly distributing liquid supplied to the vessel about an axis within said vessel, and means interposed between said distributing means and at least a portion of said outlets said means being constructed and arranged so that it may be adjusted to intercept any portion of the liquid distributed to any one of said outlets and having means for diverting said intercepted liquid to another of said outlets.

5. In a liquid distributing system, a flow box having a pair of outlets, means within the flow box for uniformly distributing liquid supplied to the flow box about an axis of the flow box, and means for apportioning to either outlet any part of the liquid distributed, said means including intercepting means mounted within the flow box and adjustable to extend between the distributing means and at least one of said outlets, and means for varying the position of the intercepting means with relation to the distributing means.

6. In a liquid distributing system the combination comprising a vessel having a plurality of outlets, means for distributing liquid toward said outlets, and adjustable means disposed in the path of the liquid discharged by said distributing means, so constructed and arranged that on adjustment it diverts a variable portion of the liquid distributed toward any one of said outlets to a different outlet.

7. In a liquid distributing system the combination comprising a vessel having a plurality of outlets, means for distributing liquid substantially uniformly among said outlets, and adjustable means disposed in the path of liquid discharged by said distributing means, constructed and arranged for directing any portion of the liquid distributed toward any one of said outlets to a different outlet.

8. In a liquid distributing system the combination comprising a vessel having a pair of outlets, means for distributing liquid in predetermined proportions substantially uniformly in a virtually radial direction toward said outlets, and intercepting means disposed in the path of liquid discharged by said distributing means, said intercepting means being adjustable to intercept any portion of the liquid distributed toward either one of the outlets and to direct said intercepted portion to the other of said outlets.

9. In a liquid distributing system, the combination comprising means for distributing liquid uniformly about a vertical axis, a container for said distributing means radially divded into at least two compartments constructed and arranged so as to receive liquid discharged by said distributing means, a shield positioned in said container so as to intercept a predetermined proportion of the liquid discharged by said distributing means, said shield being angularly adjustable about the vertical axis of said distributing means so as to intercept a variable proportion of the liquid distributed toward any one of said compartments, and delivery means carried by said shield, said delivery means being constructed and arranged so as to deliver the liquid intercepted by said shield to a compartment different from one toward which said liquid was distributed.

10. In a liquid distributing system, the combination comprising a cylindrical flow-box having a plurality of outlet compartments, a rotating liquid distributor positioned axially within said flow-box and arranged to direct its discharge toward said compartments, and a shield positioned to extend axially within said flow-box at a distance from the axis of the distributor constructed and arranged for shielding at least one of said compartments and intercepting a portion of the distributed liquid, said shield being adjustable to direct the intercepted liquid to any compartment of the flow-box except one shielded compartment.

11. In a liquid distributing system, the combination comprising a flow-box, means for dividing the flow-box into two outlet compartments, means for distributing liquid in predetermined proportions between said compartments, and means adjustably positioned in said flow-box, said means being so constructed and arranged that it may be adjusted to divert a variable portion of the liquid distributed toward either one of said compartments to the other compartment.

12. In a liquid distributing system, the combination comprising a vertical cylindrical flow-box, means for radially dividing the lower portion of the said flow-box into a pair of compartments, each compartment having a separate outlet, a rotating member for centrifugally distributing liquid introduced into the flow-box toward said compartments, a shield in said flow-box mounted for rotation about the vertical axis of said flow-box so as to intercept a predetermined fraction of the liquid discharged by said rotating member toward either one of said compartments, and means for delivering the said intercepted fraction of the liquid to the other of said compartments of the said flow-box in accordance with the angular position of said shield about said axis relative to the compartments.

13. In a liquid distributing system, the combination comprising a vertical cylindrical flow-box, a partition within the flow-box dividing the bottom portion of the flow-box into two outlet chambers, a liquid distributor within the flow-box above the partition for distributing liquid equally between said chambers, means for feeding liquid to the distributor, and a shield adjustably mounted in said flow-box so as to project into the path of liquid distributed by the distributor for diverting liquid distributed toward either outlet chamber to the other outlet chamber, said shield comprising a segment of a cylinder, co-axially mounted within the flow-box and rotatable about its axis, and having a closed bottom, an open top, and a receptacle at its base having an outlet tube extending beyond one side edge thereof for delivering liquid diverted thereby to said other chamber.

FRANK W. JAMES.